United States Patent
Ta et al.

(10) Patent No.: US 6,965,485 B2
(45) Date of Patent: Nov. 15, 2005

(54) STRUCTURE AND METHOD FOR FIXING LENS OF OPTICAL MODULE

(75) Inventors: Su Ling Ta, Chiayi (TW); Lin Ming Fang, Taichung (TW)

(73) Assignee: Creative Sensor Inc., (TW)

( * ) Notice: Subject to any disclaimer, the term of this patent is extended or adjusted under 35 U.S.C. 154(b) by 0 days.

(21) Appl. No.: 10/770,176

(22) Filed: Feb. 2, 2004

(65) Prior Publication Data

US 2005/0168844 A1   Aug. 4, 2005

(51) Int. Cl.[7] ............................................. G02B 7/02
(52) U.S. Cl. ...................... 359/819; 359/811; 359/822; 385/92; 385/93
(58) Field of Search ........................ 359/819, 811, 822, 359/823; 385/92, 93

(56) References Cited

U.S. PATENT DOCUMENTS

| | | | | |
|---|---|---|---|---|
| 5,038,027 A | * | 8/1991 | Ioka | 250/208.1 |
| 5,274,732 A | * | 12/1993 | Farnand et al. | 385/136 |
| 6,035,664 A | * | 3/2000 | Hashizume | 65/36 |
| 6,239,421 B1 | * | 5/2001 | Nagata et al. | 250/208.1 |
| 6,559,439 B1 | * | 5/2003 | Tsuchida et al. | 250/239 |

\* cited by examiner

*Primary Examiner*—Ricky L. Mack
*Assistant Examiner*—Brandi Thomas
(74) *Attorney, Agent, or Firm*—Volpe and Koenig, P.C.

(57) ABSTRACT

A lens fixing structure for an optical module of a scanner, a multi-function printer, a fax machine or a copy machine is disclosed. The lens fixing structure for an optical module of a scanner, a multi-function printer, a fax machine or a copy machine, wherein the optical module has a housing, and the lens fixing structure is installed on the housing, includes a slot structure for placing and fixing a lens therein, wherein the slot structure includes a first slot wall positioned on the housing; and a second slot wall positioned on the housing and being parallel to the first slot wall, wherein the second slot wall is perpendicular to a surface of the housing.

10 Claims, 9 Drawing Sheets

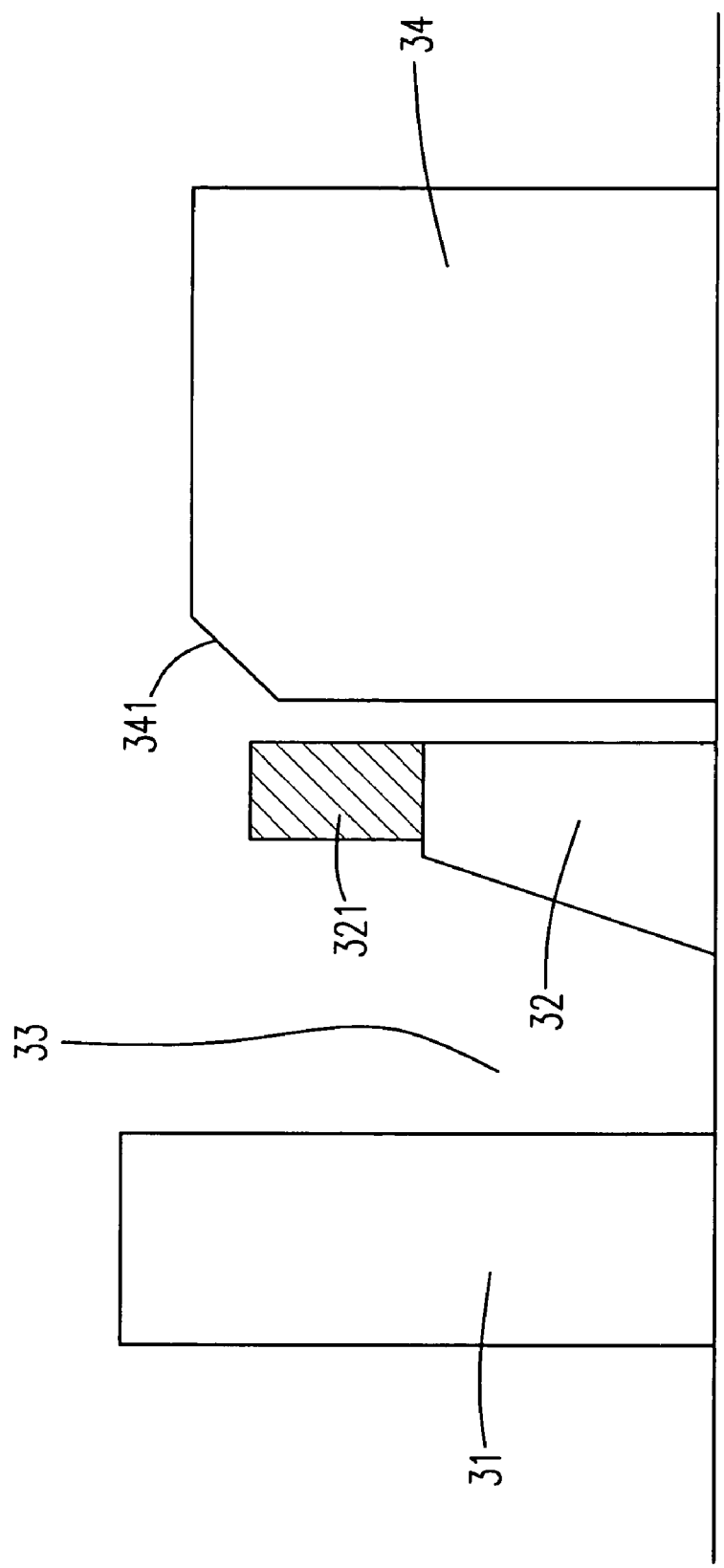

STRUCTURE AND METHOD FOR FIXING LENS OF OPTICAL MODULE

FIELD OF THE INVENTION

This invention relates to a lens fixing structure and a method for fixing lens of an optical module in a scanner, a multi-function printer, a fax machine or a copy machine, and more particularly to a lens fixing structure and a method for fixing lens of a scanner, a multi-function printer, a fax machine or a copy machine having a contact image sensor.

BACKGROUND OF THE INVENTION

In operation of a scanner, light is emitted from a source to a object, then is reflected by a set of lens. Then, the light is focused on and received by a charge-couple device (CCD) or a complementary metal oxide semiconductor (CMOS). The light signal is transferred into electric signal by such light-sensing component, so that data of analog or digital pixels are produced. During the scanning, the intensity of the light reflected from different areas of the scanned object is detected by the CCD. The low density of light is reflected from a darker area of the scanned object and the high density of light is reflected from a lighter area of the scanned object. Since the reflected light is transferred into analog or digital data by the CCD, the electric signals are proportional to the light density. Then, the electric signals are transferred into a image file by an image software compatible for the scanner, a multi-function printer, a fax machine or a copy machine.

The performance of a scanner depends on the light-controlling technology, so that the quality of the optical module is very important for the performance of the scanner.

Presently, the contact image sensor is widely used in a scanner, wherein the contact image sensor is an assembly of a light source, a rod lens, a sensing substrate and a housing.

Please refer to FIG. 1(a) showing an optical module of a scanner having a contact image sensor (CIS) according to the prior art. The CIS module includes a diode source 11, a rod lens 12, a housing 13 and a circuit plate 14. A light-sensing component 141 constructed by CCD or CMOS is arranged on the circuit plate 14 as shown in FIG. 1(b).

During the operation of the optical module, the light reflected from the scanned object is focused on the light-sensing component 141 by the rod lens 12. If the distance between positions of the rod lens 12 centerline and the light-sensing component 141 centerline is significant, the scanning quality will be bad.

For the requirements of positioning light source, injection molding and mold release, the conventional design of the housing of an optical module is shown as FIGS. 2(a) and (b), which respectively show the top view and the side view of the assembly of the rod lens 12 and the housing 13 according to FIG. 1(a). Referring to FIG. 2(a), the rod lens 20 is arranged in a slot constructed by the first slot wall 22 and the second slot wall 23 of the housing 32, and the slot is filled with a fixing gel 25.

However, the second slot wall 23 is limited by an angle 221 formed between the second slot wall 23 and the vertical axis as shown in FIG. 2(b), and a torque is formed due to the difference between the heights of the fixing gel at two sides of the rod lens 20. Therefore, the rod lens 20 is inclined as shown in FIG. 2(c). The light reflected from the scanned object is focused by the rod lens 20 to form an image which is not on the predetermined position, and consequently the center of the image is not on the light-sensing component 24 arranged on the circuit plate 21 as shown in FIG. 2(d). The quality of the obtained image is bad owing to the rod lens effect or photo response non uniformity.

Therefore, the present invention provides a lens fixing structure and a method for fixing lens of an optical module in a scanner, a multi-function printer, a fax machine or a copy machine to overcome the disadvantages of the prior art described above.

SUMMARY OF THE INVENTION

It is an aspect of the present invention to provide a lens fixing structure for fixing lens of an optical module in a scanner, a multi-function printer, a fax machine or a copy machine. According to the present invention, the torque on lens is balanced by increasing the height of the slot wall, decreasing the draft angle formed between the second slot wall and the vertical axis and uniforming heights of the fixing gel, so that the quality of image is substantially improved.

In accordance with the aspect of the present invention, a lens fixing structure for an optical module of a scanner, a multi-function printer, a fax machine or a copy machine, wherein the optical module has a housing, and the lens fixing structure is installed on the housing, includes a slot structure for placing and fixing a lens therein, wherein the slot structure includes a first slot wall positioned on the housing, and a second slot wall positioned on the housing and being parallel to the first slot wall, wherein the second slot wall is perpendicular to a surface of the housing.

Preferably, the optical module is a contact image sensor (CIS) module.

Preferably, the first slot wall and the second slot wall are integrally formed.

Preferably, the housing has a selguide thereon parallel to the second slot wall, and the selguide is disposed on one side of the second slot wall opposing to that facing the slot structure and has a light emitting plane.

Preferably, the second slot wall has a first height lower than or equivalent to a second height of said light emitting plane.

Preferably, the lens is a rod lens.

Preferably, the lens fixing structure further includes a first fixing gel and a second fixing gel for being loaded between the first slot wall and the lens and between the second slot wall and the lens, respectively, wherein the first fixing gel has a third height identical to a fourth height of the second fixing gel.

It is another aspect of the present invention to provide a method for fixing a lens of an optical module of a scanner, a multi-function printer, a fax machine or a copy machine, wherein the lens is fixed in a slot structure including a first slot wall and a second slot wall, and a housing of the scanner is installed on the optical module and has a selguide thereon parallel to the second slot, in which the selguide is disposed on one side of the second slot wall opposing to that facing the slot structure and has a light emitting plane, including steps of (a) forming the second slot wall being perpendicular to a surface of the housing; (b) increasing a first height of the second slot wall, wherein the first height is lower or equivalent to a second height of the light emitting plane; (c) placing the lens into the slot; and (d) loading a first fixing gel between the first slot wall and the lens and loading a second fixing gel between the second slot wall and the lens, wherein the first fixing gel has a third height identical to a fourth height of the second fixing gel.

Preferably, the optical module is a contact image sensor (CIS) module.

Preferably, the forming step is achieved through integrally forming said housing, said first slot wall and said second slot wall.

Preferably, the increasing step is achieved through integrally forming said housing, said first slot wall and said second slot wall.

Preferably, the lens is a rod lens.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 3(a) is a side view showing the lens fixing structure according to a preferred embodiment of the present invention;

DETAILED DESCRIPTION OF THE PREFERRED EMBODIMENT

Figure 1A:
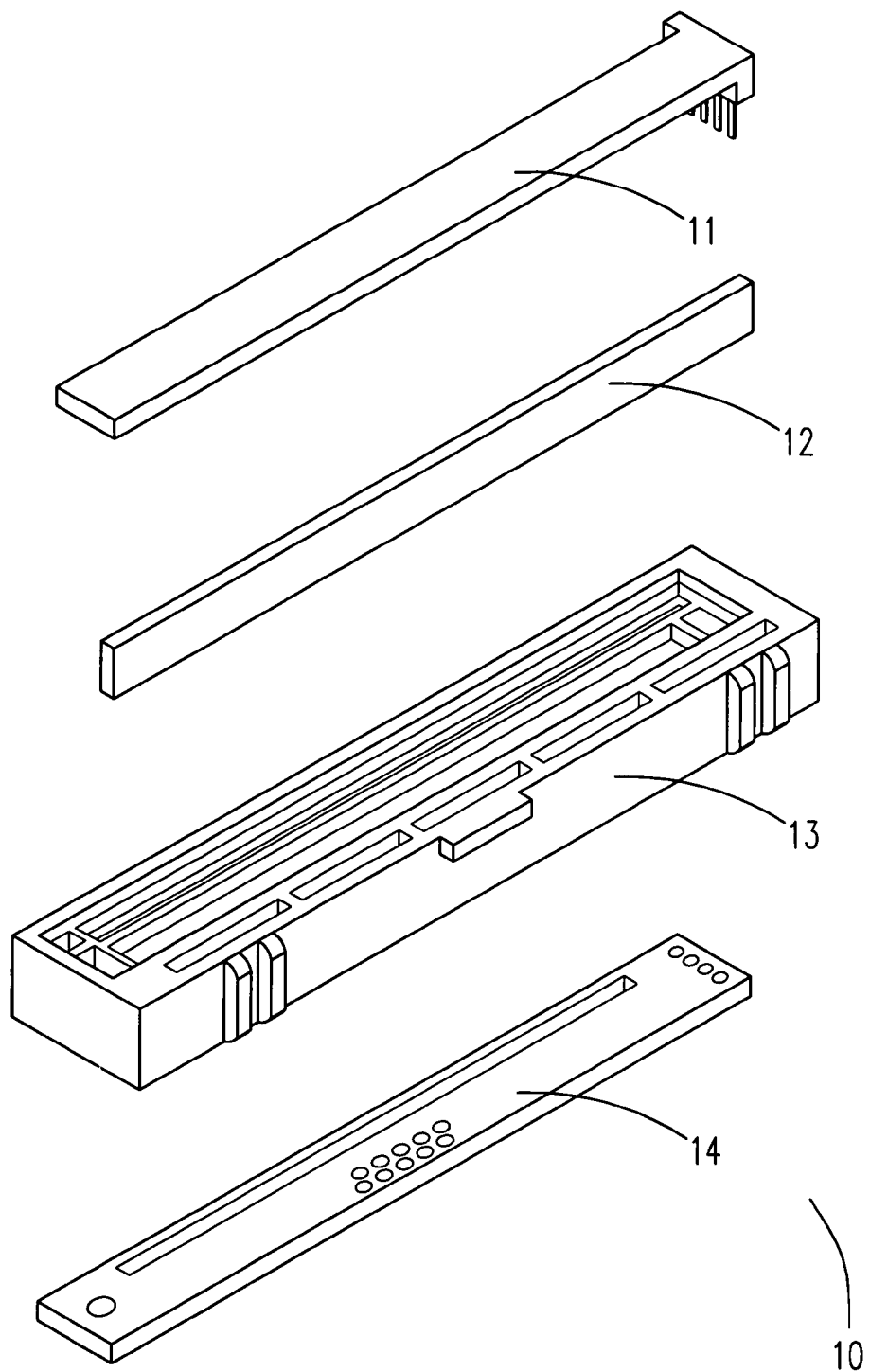
FIG. 1(a) is a schematical view showing an optical module of a scanner having the CIS according to the prior art.
Figure 1B:
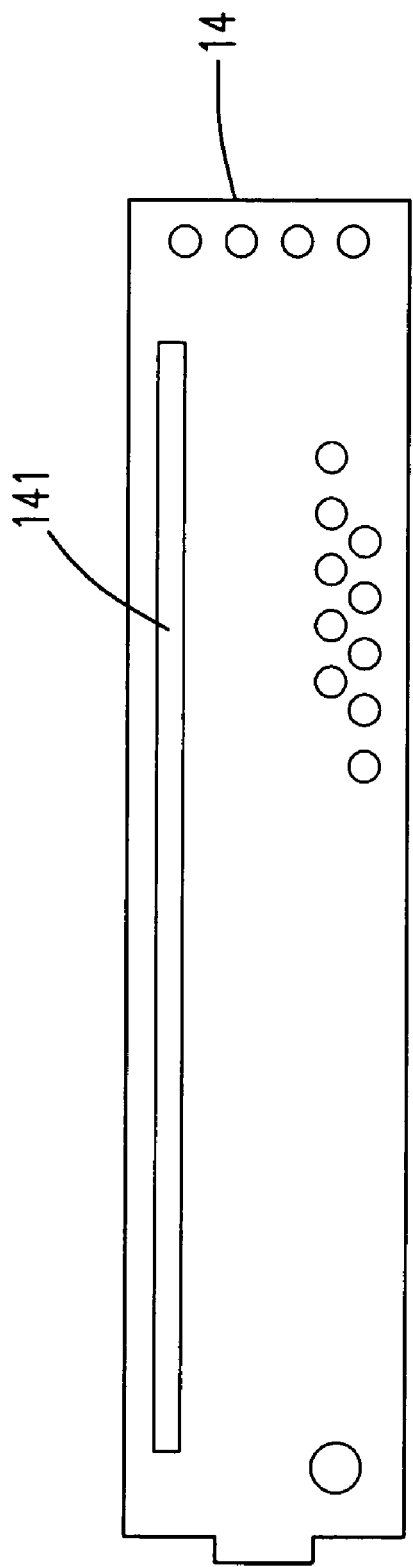
FIG. 1(b) is a schematical view showing the top plan view of the optical module according to FIG. 1(a)
Figure 2A:
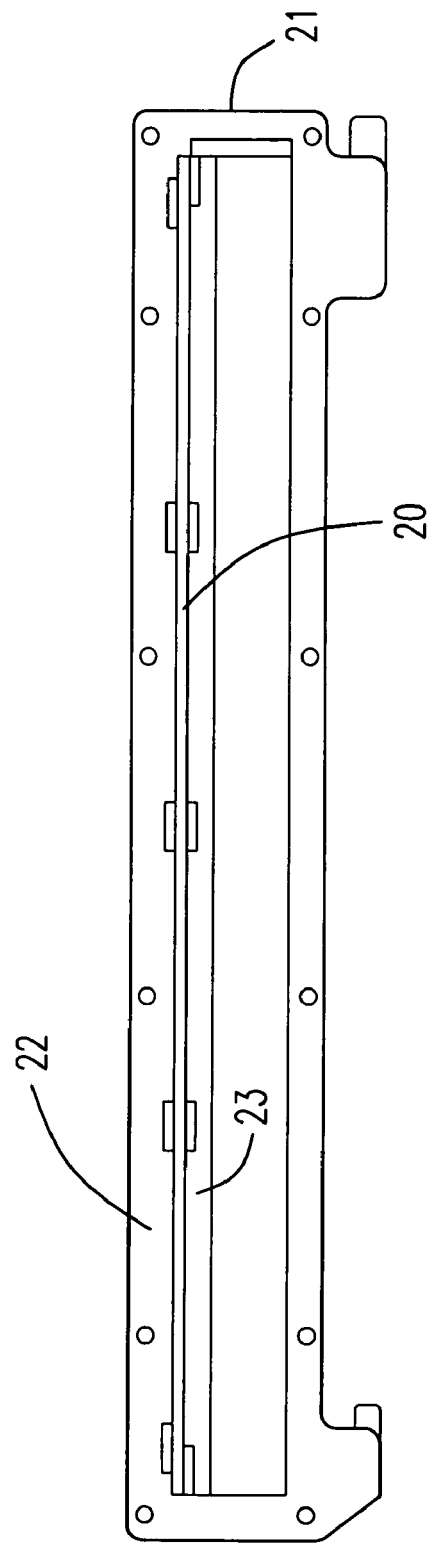
FIG. 2(a) is a schematical view showing a top plan view of an assembly of the rod lens and the housing according to FIG. 1(a)
Figure 2B:
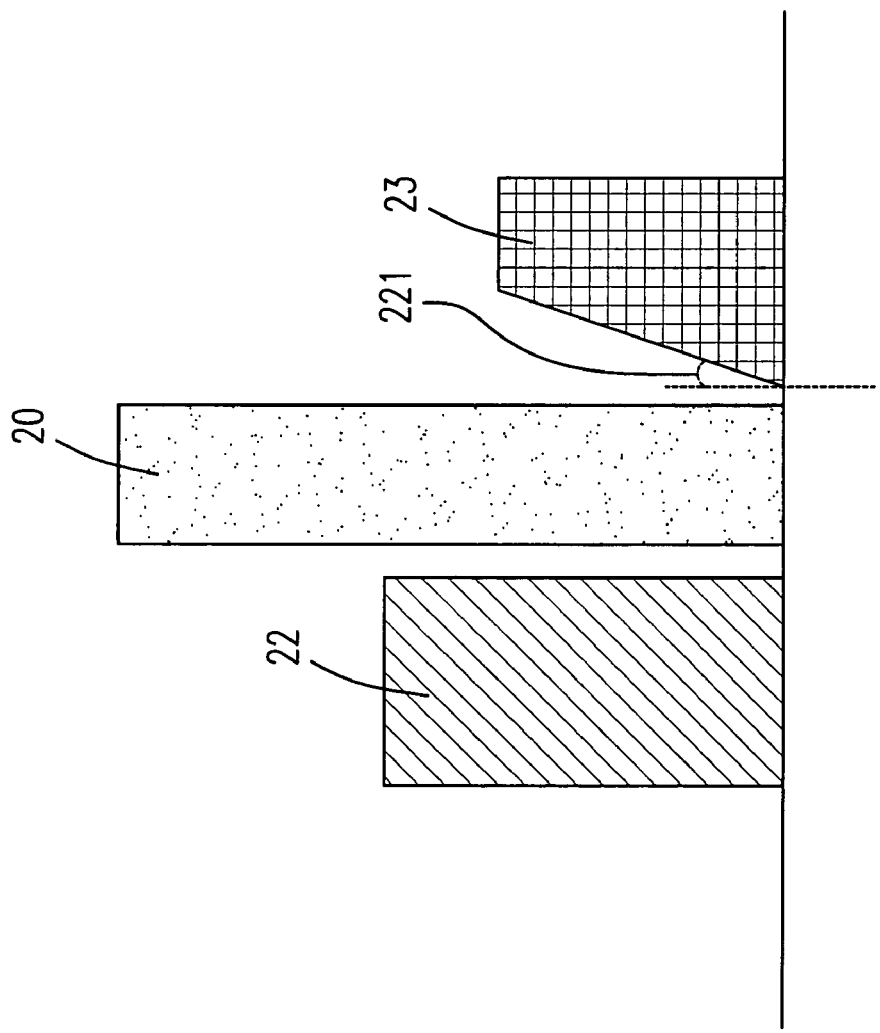
FIG. 2(b) is a side elevational view of an assembly of the rod lens and the housing according to FIG. 1(a)
Figure 2C:
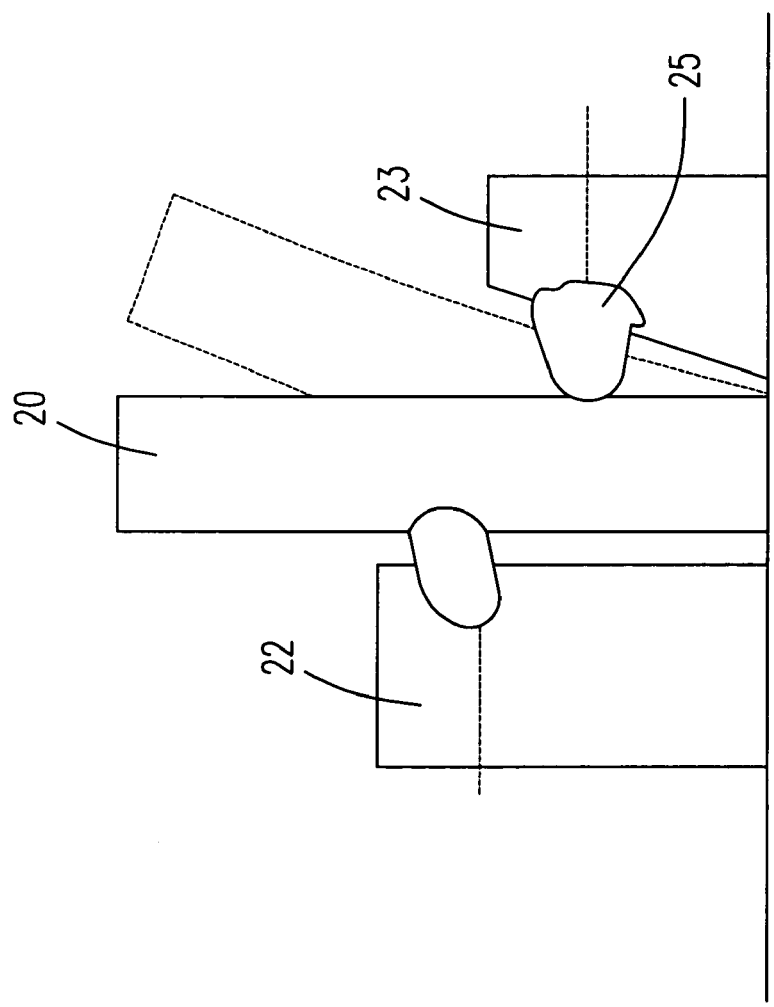
FIG. 2(c) is a schematical view showing the inclined lens after the fixing gel is loaded according to FIG. 2(b)
Figure 2D:
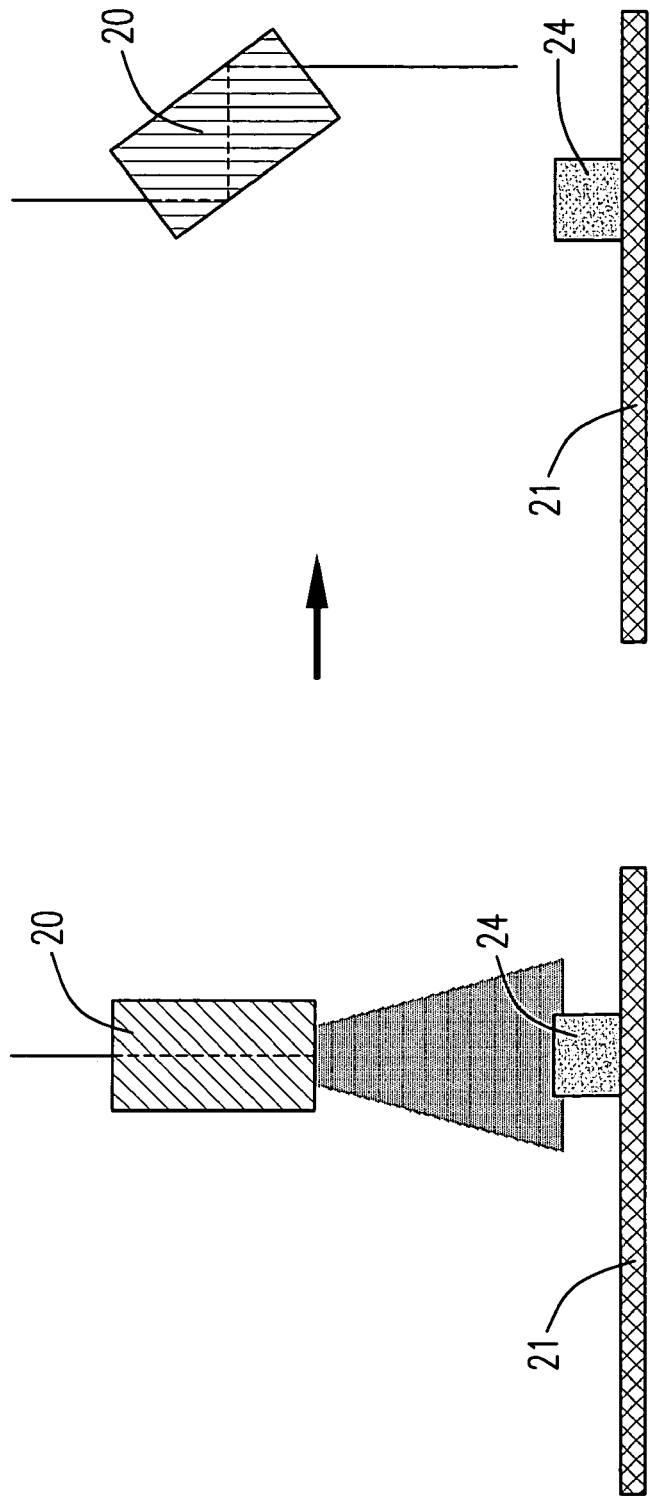
FIG. 2(d) is a schematical view showing the positions of formed images, wherein the left part shows the ideal image position, and the right part shows the position of the image formed according to FIG. 2(c)

The invention is described more specifically with reference to the following embodiments. It is to be noted that the following descriptions of preferred embodiments of this invention are presented herein for the purpose of illustration and description only; it is not intended to be exhaustive or to be limited to the precise form disclosed.

Please refer to FIG. 3(a) showing a side view of the lens fixing structure according to the preferred embodiment of the present invention. The lens fixing structure is constructed by a first slot wall 31 and a second slot wall 32 of a housing 30, wherein a slot 33 is formed between the first slot wall 31 and the second slot wall 32 for receiving and fixing a lens therein.

According to the present invention, the height of the slot wall 32 is increased, and subsequently the unbalanced torque is eliminated during loading the fixing gel. The height of the second slot wall 32 is increased by adding a block 321 on the top of the second slot wall 32 as shown in FIG. 3(a), wherein the shape of the block 321 is not limited as long as light emitted from a light emitting plane 341 of the selguide 34 aside the second slot wall 32 is not influenced by the second slot wall 32.

Figure 3B:
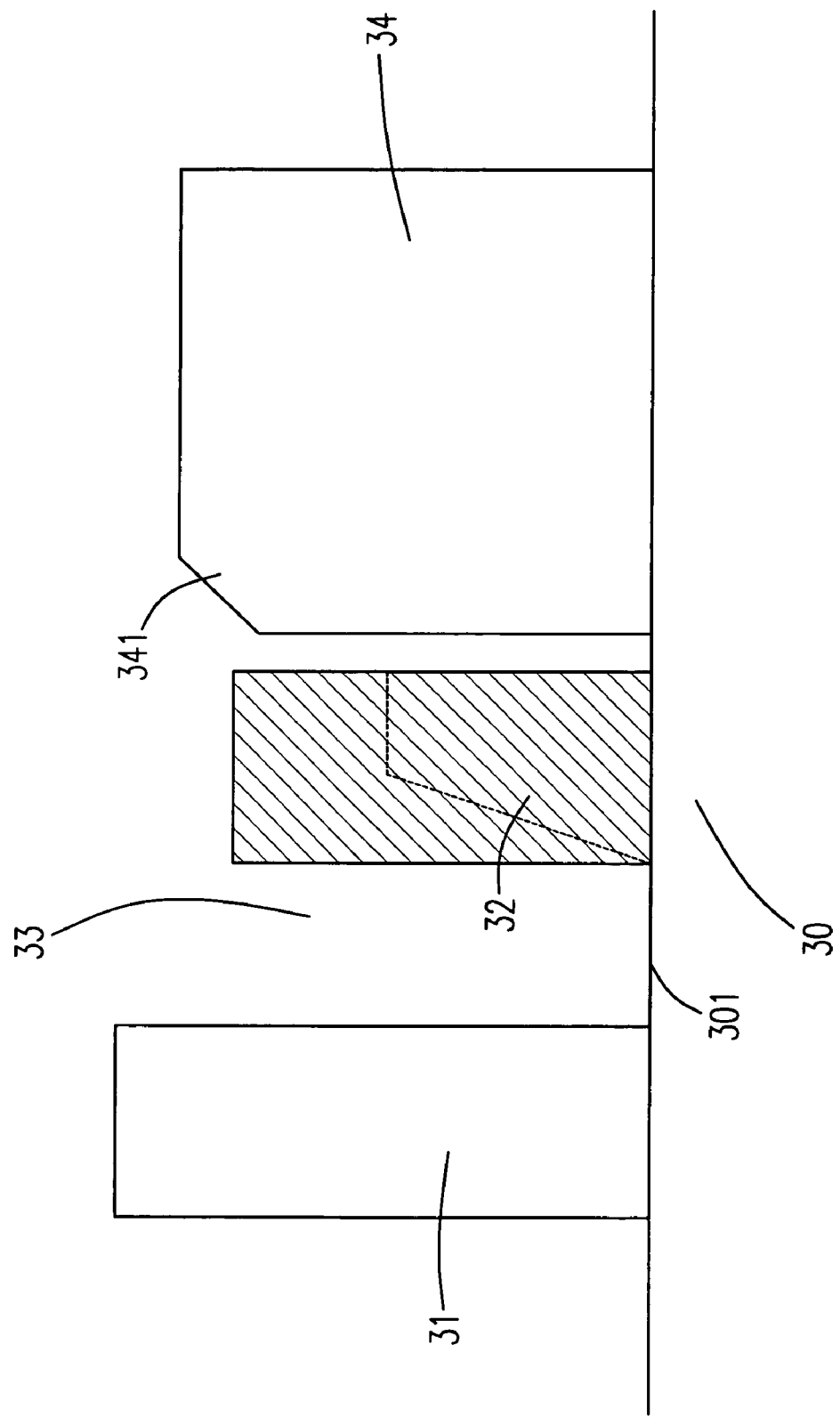
FIG. 3(b) is a side view showing the lens fixing structure according to another preferred embodiment of the present invention.

In addition to increasing the height of the second slot wall 32, the problem of the inclined lens owing to the unbalanced torque can be overcome as following illustration. Please refer to FIG. 3(b) showing a side view of another lens fixing structure according to another embodiment of the present invention. The housing 30, the first slot wall 31 and the second slot wall 32 are integrally formed during the molding, and the second slot wall 32 is perpendicular to a surface 301 of the housing 30, so that after the lens is placed into the slot 33, the light reflected from the scanned object is focused by the light-sensing component such as CCD or CMOS without suffer from the unbalanced torque.

Certainly, both two methods shown in FIGS. 3(a) and 3(b) can be commonly carried out in one lens fixing structure.

Figure 4:
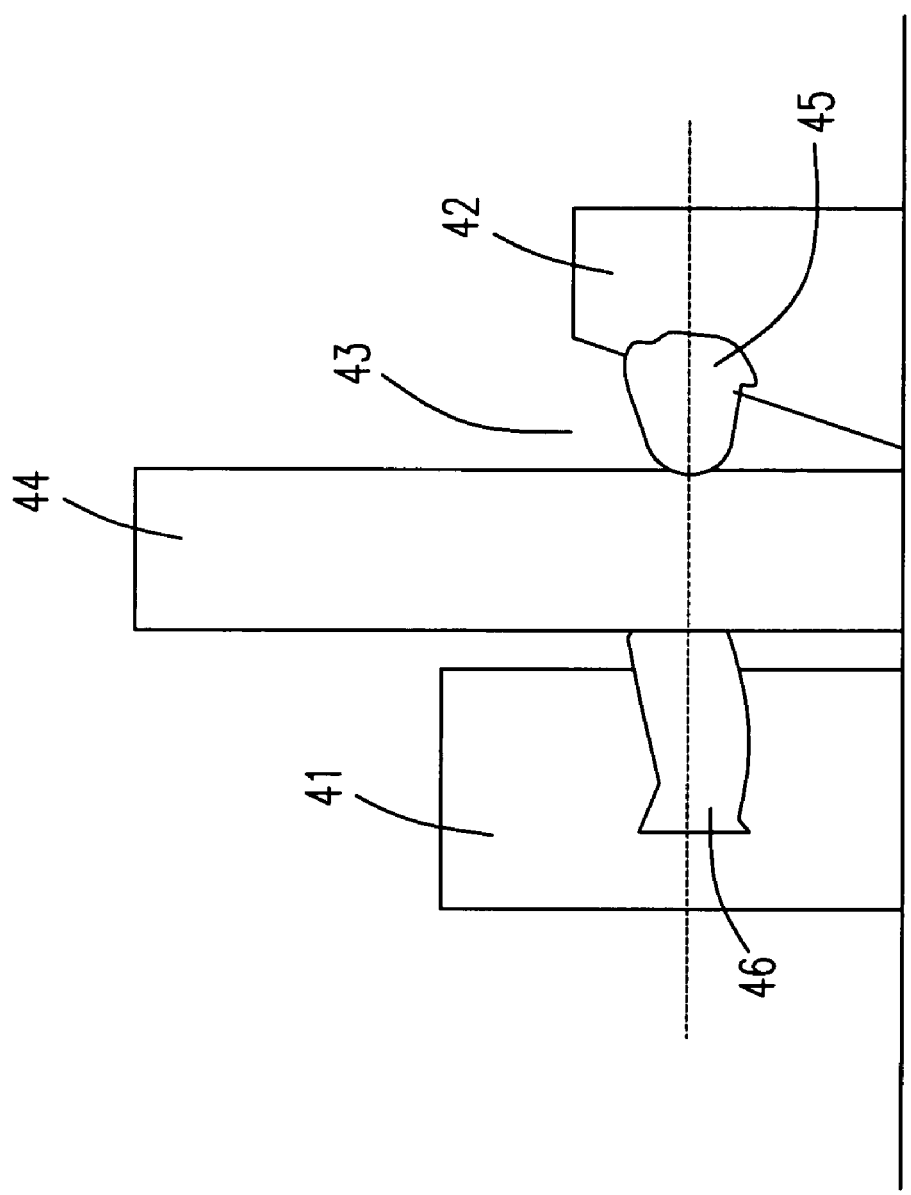
FIG. 4 is a side view showing the lens fixing structure according to another preferred embodiment of the present invention.

Furthermore, the problem of the inclined lens owing to the unbalanced torque can be overcome by improving the loading of the fixing gel in the slot for fixing a lens therein. Please refer to FIG. 4 showing a side view of another lens fixing structure according to another embodiment of the present invention. After the rod lens 44 is placed into the slot 43, the fixing gel 45 is loaded between the first slot wall 41 and the rod lens 44, and the fixing gel 46 loaded between the second slot wall 42 and the rod lens 44. It is important that the height of the fixing gel 45 has to be equal to the height of the fixing gel 46, and therefore the inclination of the rod lens owing to the unbalanced torque can be eliminated.

In conclusion, the present invention provide a lens fixing structure for fixing the perpendicularity of the rod lens of the optical module in a scanner having a contact image sensor. The purpose of present invention is achieved by (1) increasing the height of the slot wall to raise the supporting position of the rod lens, so as to eliminate the inclination of the rod lens; (2) making the second slot wall perpendicular to a surface of the housing, so as to avoid the inclination of the rod lens; and (3) uniforming the heights of the fixing gel to balance the torque, so as to prevent the rod lens from deformation.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A lens fixing structure for an optical module of a scanner, a multi-function printer, a fax machine or a copy machine, wherein said optical module has a housing, and said lens fixing structure is installed on said housing, the lens fixing structure comprising:
   a slot structure for placing and fixing a lens therein, wherein said slot structure comprises:
   a first slot wall positioned on said housing;
   a second slot wall positioned on said housing and being parallel to said first slot wall,
   a first fixing gel loaded between said lens and said first slot wall; and
   a second fixing gel loaded between said lens and said second slot wall,
   wherein said second slot wall is substantially perpendicular to a surface of said housing, heights of said first fixing gel and said second fixing gel from a surface of said housing are approximately uniformed, thereby balancing a torque on said lens, and said housing has a selguide thereon parallel to said second slot wall adjacent to a side of said second slot wall opposite the slot structure, the selguide having a light emitting plane.

2. The lens fixing structure according to claim 1, wherein said optical module is a contact image sensor (CIS) module.

3. The lens fixing structure according to claim 1, wherein said housing, said first slot wall and said second slot wall are integrally formed.

4. The lens fixing structure according to claim 1, wherein said second slot wall has a first height lower than or equivalent to a second height of said light emitting plane.

5. The lens fixing structure according to claim 1, wherein said lens is a rod lens.

6. A method for fixing a lens of an optical module of a scanner, a multi-function printer, a fax machine or a copy machine, wherein said lens is fixed in a slot structure comprising a first slot wall and a second slot wall, and a housing of said scanner is installed on said optical module and has a selguide thereon parallel to said second slot wall, in which said selguide is disposed on one side of said second slot wall opposing to that facing said slot structure and has a light emitting plane, comprising steps of:

forming said second slot wall being perpendicular to a surface of said housing;

increasing a first height of said second slot wall, wherein said first height is lower or equivalent to a second height of said light emitting plane;

placing said lens into said slot; and loading a first fixing gel between said first slot wall and said lens and loading a second fixing gel between said second slot wall and said lens, wherein said first fixing gel has a third height from a surface of said housing substantially identical to a fourth height from the surface of said housing of said second fixing gel, thereby balancing a torque on said lens.

7. The method according to claim 6, wherein said optical module is a contact image sensor (CIS) module.

8. The method according to claim 6, wherein said forming step is achieved through integrally forming said housing, said first slot wall and said second slot wall.

9. The method according to claim 6, wherein said increasing step is achieved through integrally forming said housing, said first slot wall and said second slot wall.

10. The method according to claim 6, wherein said lens is a rod lens.

\* \* \* \* \*